United States Patent
Ryu et al.

(10) Patent No.: US 8,936,873 B2
(45) Date of Patent: *Jan. 20, 2015

(54) CATHODE ACTIVE MATERIAL AND LITHIUM SECONDARY BATTERY CONTAINING THEM

(75) Inventors: Ji Heon Ryu, Seoul (KR); Min Su Kim, Daejeon (KR); Jung Eun Hyun, Seoul (KR); Jaepil Lee, Daejeon (KR); Eun Ju Lee, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 656 days.

This patent is subject to a terminal disclaimer.

(21) Appl. No.: 12/728,874

(22) Filed: Mar. 22, 2010

(65) Prior Publication Data

US 2011/0039159 A1 Feb. 17, 2011

Related U.S. Application Data

(63) Continuation-in-part of application No. 11/503,837, filed on Aug. 14, 2006, now Pat. No. 7,700,238.

(30) Foreign Application Priority Data

Aug. 16, 2005 (KR) .................. 10-2005-0074697

(51) Int. Cl.
  *H01M 4/13* (2010.01)
  *H01M 4/50* (2010.01)
  *H01M 4/58* (2010.01)
  *H01M 4/525* (2010.01)
  *H01M 4/36* (2006.01)
  *H01M 4/505* (2010.01)
  *H01M 10/0525* (2010.01)

(52) U.S. Cl.
CPC ............. *H01M 4/525* (2013.01); *H01M 4/364* (2013.01); *H01M 4/505* (2013.01); *H01M 10/0525* (2013.01); *Y02E 60/122* (2013.01); *Y02T 10/7011* (2013.01)
USPC .......................... 429/223; 429/224; 429/231.3

(58) Field of Classification Search
USPC ............ 429/223, 224, 231.1, 231.3; 423/594, 423/594.6, 599
See application file for complete search history.

(56) References Cited

U.S. PATENT DOCUMENTS

| | | | |
|---|---|---|---|
| 2002/0061443 A1 | 5/2002 | Nakanishi et al. | |
| 2002/0164528 A1 | 11/2002 | Sunagawa et al. | |
| 2003/0010631 A1* | 1/2003 | Anzai | 204/293 |
| 2004/0126661 A1* | 7/2004 | Nagayama et al. | 429/224 |
| 2005/0271943 A1* | 12/2005 | Park et al. | 429/231.1 |
| 2006/0046143 A1 | 3/2006 | Nakai et al. | |
| 2007/0292761 A1* | 12/2007 | Park et al. | 429/223 |

FOREIGN PATENT DOCUMENTS

| | | |
|---|---|---|
| CN | 1345101 A | 4/2002 |
| JP | 2003092108 A | 3/2003 |
| JP | 2002110253 A | 4/2004 |
| JP | 2004134245 A | 4/2004 |
| KR | 1020040007356 | 1/2004 |
| KR | 1020050030817 | 3/2005 |
| KR | 1020050066653 | 6/2005 |
| WO | 2006/071972 A2 | 7/2006 |
| WO | WO 2006/071972 A2 * | 7/2006 |

OTHER PUBLICATIONS

Non-Final Office Action for U.S. Appl. No. 11/503,837 dated May 28, 2008.
Final Office Action for U.S. Appl. No. 11/503,837 dated Feb. 27, 2009.
Interview Summary for U.S. Appl. No. 11/503,837 dated Jun. 25, 2009.
Advisory Action for U.S. Appl. No. 11/503,837 dated Aug. 28, 2009.
Petition Granted for U.S. Appl. No. 11/503,837 dated Sep. 30, 2009 issued by Charlema Grant, Petitions Attorney, Office of Petitions.
Notice of Allowance for U.S. Appl. No. 11/503,837 dated Dec. 3, 2009 issued by Muhammad S. Siddiquee.
Zheng, et al., (Dept. of Materials Sci. and Engin. State Key Lab of New Ceramics and Fine Processing, Tsinghua Univ., Beijing 10084, China) An Investigation of Structural Properties of Li-Al-mixed Doped Spinals Materials Li1+xAlyMn2−yO4; Electrochemistry; Nov. 2011 (English translation of Abstract only.)
Myung, et al., Enhanced Strutural Stability and Cyclability of Al-Doped LiMn2O4 Spinel Synthesized by the Emulsion of Drying Method, Journal of The Electrochemical Society, 148 (5) A482-A489 (2001).
Song, et al., The spinal phases LiAlyMn2−yO4 (y=0, 1/12, 1/9, 1/6, 1/3) and Li(A1,M)1/6Mn11/6O4 (M=Cr, Co) as the cathod for rechargeable lithium batteries, Sold State Ionics 117 (1999) 151-156.

* cited by examiner

*Primary Examiner* — Muhammad Siddiquee
(74) *Attorney, Agent, or Firm* — Lerner, David, Littenberg, Krumholz & Mentlik, LLP

(57) ABSTRACT

Provided is a non-aqueous electrolyte-based, high-power lithium secondary battery having a long service life and superior safety at both room temperature and high temperature, even after repeated high-current charging and discharging. The battery comprises a mixture of a lithium/manganese spinel oxide having a substitution of a manganese (Mn) site with a certain metal ion and a lithium/nickel/cobalt/manganese composite oxide, as a cathode active material.

5 Claims, No Drawings

CATHODE ACTIVE MATERIAL AND LITHIUM SECONDARY BATTERY CONTAINING THEM

CROSS REFERENCE TO RELATED APPLICATIONS

The present application is a continuation-in-part of U.S. application Ser. No. 11/503,837 filed Aug. 14, 2006 (now U.S. Pat. No. 7,700,238) which claims priority from Korean Patent Application No. 10-2005-0074697, filed Aug. 16, 2005, all of which are incorporated herein by reference.

FIELD OF THE INVENTION

The present invention relates to a non-aqueous electrolyte-based, high-power lithium secondary battery having a long-term service life and superior safety at both room temperature and high temperature, even after repeated high-current charge and discharge.

BACKGROUND OF THE INVENTION

Technological development and increased demand for mobile equipment have led to a rapid increase in the demand for secondary batteries as an energy source. In recent years, applicability of secondary batteries has been realized as power sources for electric vehicles (EVs) and hybrid electric vehicles (HEVs). In the light of such trends, a great deal of research and study has been focused on secondary batteries which are capable of meeting various demands. Among other things, there has been an increased demand for lithium secondary batteries having high-energy density, high-discharge voltage and power output stability.

Particularly, lithium secondary batteries for use in EVs require not only high-energy density and capability to exert large power output within a short period of time, but also a long-term service life of more than 10 years even under severe conditions in which high-current charge/discharge cycles are repeated within a short time, thus necessitating remarkably superior safety and long-term service life compared to conventional small-size lithium secondary batteries.

Lithium ion secondary batteries that have been used in conventional small-size batteries generally employ a layered structure of lithium cobalt composite oxide as a cathode material and a graphite-based material as an anode material. However, the main constitutional element of the lithium cobalt composite oxide, cobalt, is very expensive and is not suitable for use in electric vehicles due to safety concerns. Therefore, as the cathode material of lithium ion batteries for EVs, a lithium manganese composite oxide having a spinel structure made up of manganese is ideal in terms of both cost and safety.

However, the lithium manganese composite oxide, upon high-temperature and high-current charge/discharge, undergoes elution of manganese ions into an electrolyte due to the influence of the electrolyte, thus resulting in degradation of battery properties and performance. Thus, there is a need for measures to prevent such problems. In addition, the lithium manganese composite oxide has drawbacks such as a low capacity per unit weight, i.e., a low charge density, as compared to conventional lithium cobalt composite oxides or lithium nickel composite oxides. Thus, there is a limit to charge density of the battery and in order to enter practical use as the power source of EVs, HEVs and the like, designs of the battery to solve such disadvantages should be effected together.

In order to alleviate the above-mentioned respective disadvantages, various studies and attempts to fabricate electrodes using a mixed cathode active material have been made. For example, Japanese Patent Laid-open Publication Nos. 2002-110253 and 2004-134245 disclose techniques utilizing a mixture of lithium/manganese composite oxide, and lithium/nickel/cobalt/manganese composite oxide and/or lithium/nickel/cobalt/manganese composite oxide to enhance recovery output and the like. These arts, however, still suffer from problems associated with a poor cycle life of the lithium manganese oxide and limited improvement of safety.

SUMMARY OF THE INVENTION

Therefore, it is an object of the present invention to solve the above problems, and other technical problems that have yet to be resolved.

Specifically, an object of the present invention is to provide a cathode active material for a secondary battery, comprising a mixture of a manganese spinel oxide having a substitution of a manganese (Mn) site with a certain metal element and a lithium/nickel/cobalt/manganese composite oxide, whereby the battery can secure safety and, due to alleviation of disadvantages of the lithium/manganese oxide, can have a long-term service life at both room temperature and high temperature, even after repeated high-current charge and discharge.

Another object of the present invention is to provide a lithium secondary battery comprising the above-mentioned cathode active material, upon fabrication of the cathode.

DETAILED DESCRIPTION OF PREFERRED EMBODIMENTS

In accordance with an aspect of the present invention, the above and other objects can be accomplished by the provision of a cathode active material for a lithium secondary battery, comprising a mixture of a lithium/manganese spinel oxide represented by Formula I below and a lithium/nickel/cobalt/manganese composite oxide represented by Formula II below:

$$Li_{1+x}Mn_{2-y}M_yO_4 \qquad \text{Formula I}$$

wherein,
M is a metal having an oxidation number of 2 to 3;
$0 \leq x \leq 0.2$; and
$0 < y \leq 0.2$.

$$Li_{1+z}Ni_bMn_cCo_{1-(b+c)}O_2 \qquad \text{Formula II}$$

wherein,
$-0.1 \leq z \leq 0.1$;
$0.2 \leq b \leq 0.7$;
$0.1 \leq c \leq 0.6$; and
$b+c<1$,
wherein the mixing ratio of the lithium/manganese spinel oxide:lithium/nickel/cobalt/manganese composite oxide is in the range of 10:90 to 90:10 (w/w); and
wherein the cathode active material exhibits the life characteristics that the capacity at 300 cycles is more than 75% relative to the initial capacity.

In accordance with another aspect of the present invention, there is provided a lithium secondary battery comprising the above-mentioned cathode active material-containing cathode, an anode, a separator and a non-aqueous electrolyte.

Hereinafter, the present invention will be described in more detail.

As discussed hereinbefore, the present invention is characterized by using a mixture of the lithium/nickel/cobalt/manganese oxide and the lithium/manganese spinel oxide wherein a portion of manganese (Mn) is substituted with other metal elements, as a cathode active material.

In the lithium/manganese spinel oxide of Formula I, manganese (Mn) is substituted with a metal (M) having an oxidation number of 2 or 3 within the predetermined range. Herein, the metal (M) may be preferably aluminum (Al), magnesium (Mg) or both of them.

Since the oxidation number of the substituent metal is smaller than that of manganese (Mn), an increasing amount of the substituted metal leads to a decrease in an average value of the oxidation number and a relative increase in the oxidation number of manganese (Mn), consequently resulting in inhibition of manganese (Mn) dissolution. That is, life characteristics are further improved as the amount of the substituted metal (y) in the lithium/manganese spinel oxide increases. However, since an increasing amount of the substituted metal (y) is also accompanied by a decrease of initial capacity, a maximum value of y is preferably less than 0.2, which is capable of maximizing improvements of the life characteristics and minimizing reduction of the initial capacity of the battery. More preferably, the value of y is in the range of 0.01 to 0.2.

Where appropriate, high-temperature cycle characteristics and capacity preservation characteristics may be improved to some extent by adjusting the composition ratio of constituent elements in the lithium/manganese spinel oxide, but there are limitations to high-temperature safety and capacity per weight.

Therefore, as the cathode active material, the present invention uses the lithium/manganese spinel oxide in admixture with a certain lithium/nickel/cobalt/manganese composite oxide of Formula II which is an active material expected to increase a service life due to a higher stability thereof The lithium/nickel/cobalt/manganese composite oxide is a lithium oxide which simultaneously contains nickel, manganese and cobalt elements, as shown in Formula II, and significantly improves, in combination with the lithium/manganese spinel oxide, the safety and life characteristics of the cathode active material according to the present invention. The lithium/nickel/cobalt/manganese composite oxide contains at least 0.2 M nickel, provided that it contains manganese and cobalt. Particularly, the lithium/nickel/cobalt/manganese composite oxide having a relatively high content of nickel compared to that of manganese and cobalt is more preferred for realization of high capacity.

In one preferred embodiment, the lithium/nickel/cobalt/manganese composite oxide has an element composition represented by Formula IIa, characterized in that lithium ions intercalate into and deintercalate from mixed transition metal oxide layers ("MO layers") and some of MO layer-derived Ni ions are inserted into intercalation/deintercalation layers of lithium ions ("lithium layers") to thereby interconnect the MO layers:

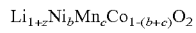
$$Li_{1+z}Ni_bMn_cCo_{1-(b+c)}O_2$$  Formula IIa wherein, $-0.1 \leq z \leq 0.1$, $0.4 \leq b \leq 0.7$, $0.1 \leq c \leq 0.5$, and $0.6 \leq b+c \leq 0.9$.

The inventors of the present invention have confirmed that the crystal structure stabilizes contrary to conventionally known or accepted ideas in the related art that intercalation/deintercalation of lithium ions will be hindered when some of nickel ions go down to and immobilize in the lithium layers, so it is possible to prevent problems associated with collapse of the crystal structure caused by the intercalation/deintercalation of lithium ions. As a result, since the lifespan characteristics and safety are simultaneously improved due to no occurrence of additional structural collapse by oxygen desorption and prevention of further formation of $Ni^{2+}$, the battery capacity and cycle characteristics can be significantly improved and a desired level of rate characteristics can be exerted.

That is, due to the insertion of some Ni ions into the lithium layers, the lithium/nickel/cobalt/manganese composite oxide of Formula IIa does not undergo disintegration of the crystal structure with maintenance of the oxidation number of Ni ions inserted into the lithium layers, thereby being capable of maintaining a well-layered structure, even when lithium ions are released during a charge process. Hence, a battery comprising the lithium/nickel/cobalt/manganese composite oxide of Formula IIa having such a structure as a cathode active material can exert a high capacity and a high-cycle stability.

The lithium/nickel/cobalt/manganese composite oxide of Formula IIa may have preferably a structure wherein $Ni^{2+}$ and $Ni^{3+}$ coexist in the MO layers and some of $Ni^{2+}$ are inserted into the lithium layers. That is, in such a structure of the metal oxide, all of Ni ions inserted into the lithium layers are $Ni^{2+}$ and the oxidation number of Ni ions is not changed in the charge process.

Specifically, when $Ni^{2+}$ and $Ni^{3+}$ coexist in a Ni-excess lithium transition metal oxide, an oxygen atom-deficient state is present under given conditions (reaction atmosphere, Li content, etc.) and therefore insertion of some $Ni^{2+}$ ions into the lithium layers may occur with changes in the oxidation number of Ni.

Therefore, since $Ni^{2+}$ is inserted into and serves to support the MO layers, $Ni^{2+}$ is preferably contained in an amount enough to stably support between MO layers such that the charge stability and cycle stability can be improved to a desired level, and at the same time it is inserted in an amount not so as to hinder intercalation/deintercalation of lithium ions into/from the lithium layers such that rate characteristics are not deteriorated. Taken altogether, the mole fraction of $Ni^{2+}$ inserted and bound into the reversible layers may be preferably in a range of 0.03 to 0.07, based on the total content of Li sites present in the lithium layers.

The further preferred element composition meets the requirements of $0.45 \leq b \leq 0.65$, $0.2 \leq c \leq 0.4$, and $0.65 \leq b+c \leq 0.85$.

The mixing ratio of the lithium/manganese spinel oxide (Formula I) and lithium/nickel/cobalt/manganese composite oxide (Formula II) is preferably in the range of 90:10 to 10:90 (w/w). If the content of the composite oxide (I) among two composite oxides is excessively low, the stability of the battery is lowered. Conversely, if the content of the composite oxide (II) is excessively low, it is undesirably difficult to achieve desired life characteristics. These facts will also be illustrated and confirmed in the following Examples and Comparative Examples hereinafter.

Methods of preparing the lithium metal composite oxides such as the lithium/manganese spinel oxides of Formula I and the lithium/nickel/cobalt/manganese composite oxides of Formula II including the composite oxides of Formula IIa can be easily reproduced by those skilled in the art based upon the compositions of the formulas and thus will not be described herein.

Hereinafter, fabrication of a cathode containing a cathode active material according to the present invention will be specifically illustrated.

First, the cathode active material of the present invention, and a binder and a conductive material in a content of 1 to 20% by weight relative to the active material are added to a dispersion solvent and the resulting dispersion is stirred to prepare an electrode paste. The paste is applied to a metal plate for a current collector which is then compressed and dried to fabricate a laminate electrode.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

As examples of the binder that may be utilized in the present invention, mention may be made of polytetrafluoroethylene (PTFE), polyvinylidene fluoride (PVdF), cellulose, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

Where appropriate, the filler may be optionally added as an ingredient to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

Representative examples of the dispersion solvent that can be used in the present invention may include isopropyl alcohol, N-methyl pyrrolidone (NMP) and acetone.

Uniform application of the paste of electrode materials to a metal material may be carried out by conventional methods known in the art or appropriate novel methods, taking into consideration characteristics of materials to be used. For example, preferably the electrode paste is distributed onto the current collector and is then uniformly dispersed thereon using a doctor blade. Where appropriate, distribution and dispersion of the electrode paste may also be performed in a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination.

Drying of the paste applied over the metal plate is preferably carried out in a vacuum oven at 50 to 200° C. for 1 to 3 days.

Further, the present invention provides a lithium secondary battery comprising an electrode assembly composed of the above-fabricated cathode and an anode, which are arranged opposite to each other with a separator therebetween, and a lithium salt-containing, non-aqueous electrolyte.

The anode is, for example, fabricated by applying an anode active material to an anode current collector, followed by drying. If desired, the anode may further optionally include other components such as conductive material, binder and filler, as described above.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesion to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogen atoms; $0 < x \leq 1$; $1 \leq y \leq 3$; and $1 \leq z \leq 8$); lithium metals; lithium alloys; silicon based alloys; tin based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or kraft papers made of an olefin polymer such as polypropylene and/or glass fibers or polyethylene, which have chemical resistance and hydrophobicity, are used. Typical examples of commercially available products for the separator may include Celgard series such as Celgard™ 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase the battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and electrolyte.

The lithium salt-containing non-aqueous electrolyte is composed of a non-aqueous electrolyte and lithium. As the non-aqueous electrolyte, a non-aqueous electrolytic solution, organic solid electrolyte and inorganic solid electrolyte may be utilized.

As examples of the non-aqueous electrolytic solution that can be used in the present invention, mention may be made of non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

A substituted lithium/manganese spinel oxide of $Li_{1+x}Mn_{1.95}Al_{0.05}O_4$ and a lithium/nickel/cobalt/manganese composite oxide of $Li_{1+z}Ni_{1/3}Co_{1/3}Mn_{1/3}O_2$ were mixed in a weight ratio of 1:1 to thereby prepare a cathode active material. The cathode active material was mixed with 5% by weight of carbon black and 5% by weight of PVdF as a binder, and stirred with NMP as a solvent. The resulting mixture was coated on aluminum foil as a metal current collector which was then dried in a vacuum oven at 120° C. for more than 2 hours, thereby fabricating a cathode.

An electrode assembly was fabricated using the thus-fabricated cathode, an anode which was fabricated by coating mesocarbon microbeads (MCMBs) as artificial graphite on copper foil, and a porous separator made of polypropylene. The electrode assembly was placed in a pouch case to which electrode leads were then connected. Thereafter, as an electrolyte, a solution of ethylene carbonate (EC) and dimethyl carbonate (DMC) (1:1, v/v), in which 1M $LiPF_6$ salt was dissolved, was injected thereto, followed by sealing the case to assemble a lithium secondary battery.

The thus-fabricated lithium secondary battery was subjected to charge/discharge cycling in a voltage range of 3.0 to 4.2V and life characteristics of the battery were measured. The results thus obtained are given in Table 1 below.

Example 2

A lithium secondary battery was assembled in the same manner as in Example 1, except that a cathode active material was prepared using a substituted lithium/manganese spinel oxide of $Li_{1+x}Mn_{1.9}Al_{0.1}O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

Example 3

A lithium secondary battery was assembled in the same manner as in Example 1, except that a cathode active material was prepared using a substituted lithium/manganese spinel oxide of $Li_{1+x}Mn_{1.8}Al_{0.2}O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

Example 4

A lithium secondary battery was assembled in the same manner as in Example 1, except that a cathode active material was prepared using a substituted lithium/manganese spinel oxide of $Li_{1+x}Mn_{1.95}Mg_{0.05}O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

Example 5

A lithium secondary battery was assembled in the same manner as in Example 1, except that a cathode active material was prepared using a substituted lithium/manganese spinel oxide of $Li_{1+x}Mn_{1.9}Mg_{0.1}O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

Example 6

A lithium secondary battery was assembled in the same manner as in Example 1, except that a cathode active material was prepared using a substituted lithium/manganese spinel oxide of $Li_{1+x}Mn_{1.8}Mg_{0.2}O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

Comparative Example 1

A lithium secondary battery was assembled in the same manner as in Example 1, except that a cathode active material was prepared using a non-substituted lithium/manganese spinel oxide of $Li_{1+x}Mn_2O_4$, instead of using $Li_{1+x}Mn_{1.95}Al_{0.05}O_4$. The thus-fabricated lithium secondary battery was subjected to charge/discharge cycling in a voltage range of 3.0 to 4.2V and life characteristics of the battery were measured. The results are given in Table 1 below.

TABLE 1

|  | Substituent metal ions | Substitution amount of metal ions (y) | Life characteristics (Capacity at 300 cycles relative to initial capacity, %) |
| --- | --- | --- | --- |
| Ex. 1 | Al | 0.05 | 78 |
| Ex. 2 | Al | 0.1 | 84 |
| Ex. 3 | Al | 0.2 | 85 |
| Ex. 4 | Mg | 0.05 | 80 |
| Ex. 5 | Mg | 0.1 | 82 |
| Ex. 6 | Mg | 0.2 | 83 |
| Comp. Ex. 1 | — | 0 | 56 |

As can be seen from Table 1, in the composite oxide mixtures of the cathode active materials, substitution of a manganese (Mn) site of the lithium/manganese spinel oxide with aluminum (Al) or magnesium (Mg) has led to significant improvements in life characteristics of the battery. In addition, the higher substitution amounts (y-value) of metal ions have led to further improvements in life characteristics. However, as will be seen in Comparative Examples 2 and 3 hereinafter, it was confirmed that when the substitution amount, i.e., the y value, exceeds 0.2, the initial capacity of the battery is decreased.

Comparative Example 2

A lithium secondary battery was assembled in the same manner as in Example 1, except that a cathode active material was prepared using a substituted lithium/manganese spinel oxide of $Li_{1+x}Mn_{1.7}Al_{0.3}O_4$. The thus-fabricated lithium secondary battery was subjected to charge/discharge cycling in a voltage range of 3.0 to 4.2V, and the initial capacity of the battery was measured and compared with the secondary battery of Example 1. The results have confirmed 14% decrease of battery capacity, relative to the initial capacity of the secondary battery of Example 1.

Comparative Example 3

A lithium secondary battery was assembled in the same manner as in Example 1, except that a cathode active material was prepared using a lithium/manganese spinel oxide of $Li_{1+x}Mn_{1.7}Mg_{0.3}O_4$. The thus-fabricated lithium secondary battery was subjected to charge/discharge cycling in a voltage range of 3.0 to 4.2V, and the initial capacity of the battery was measured and compared with the secondary battery of Example 1. The results have confirmed 24% decrease of battery capacity, relative to the initial capacity of the secondary battery of Example 1.

Example 7

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+x}Ni_{1/3}Co_{1/3}Mn_{1/3}O_2$ in a weight ratio of 90:10. The thus-fabricated lithium secondary battery was subjected to charge/discharge cycling in a voltage range of 3.0 to 4.2V and life characteristics of the battery were measured. The results are given in Table 2 below.

Example 8

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{1/3}Co_{1/3}Mn_{1/3}O_2$ in a weight ratio of 70:30. The thus-fabricated lithium secondary battery was subjected to charge/discharge cycling in a voltage range of 3.0 to 4.2V and life characteristics of the battery were measured. The results are given in Table 2 below.

Example 9

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{1/3}Co_{1/3}Mn_{1/3}O_2$ in a weight ratio of 50:50 (1:1). The thus-fabricated lithium secondary battery was subjected to charge/discharge cycling in a voltage range of 3.0 to 4.2V and life characteristics of the battery were measured. The results are given in Table 2 below.

Example 10

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{1/3}Co_{1/3}Mn_{1/3}O_2$ in a weight ratio of 30:70. The thus-fabricated lithium secondary battery was subjected to charge/discharge cycling in a voltage range of 3.0 to 4.2V and life characteristics of the battery were measured. The results are given in Table 2 below.

Example 11

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{1/3}Co_{1/3}Mn_{1/3}O_2$ in a weight ratio of 10:90. The thus-fabricated lithium secondary battery was subjected to charge/discharge cycling in a voltage range of 3.0 to 4.2V and life characteristics of the battery were measured. The results are given in Table 2 below.

Comparative Example 4

A lithium secondary battery was assembled in the same manner as in Example 1, except that a cathode active material was prepared using only a substituted lithium/manganese spinel oxide of $Li_{1+x}Mn_{1.9}Al_{0.1}O_4$. The thus-fabricated lithium secondary battery was subjected to charge/discharge cycling in a voltage range of 3.0 to 4.2V and life characteristics of the battery were measured. The results are given in Table 2 below.

Comparative Example 5

A lithium secondary battery was assembled in the same manner as in Example 1, except that a cathode active material was prepared using only a lithium/nickel/cobalt/manganese composite oxide of $Li_{1+z}Ni_{1/3}Co_{1/3}Mn_{1/3}O_2$. The thus-fabricated lithium secondary battery was subjected to charge/discharge cycling in a voltage range of 3.0 to 4.2V and life characteristics of the battery were measured. The results are given in Table 2 below.

TABLE 2

| | Weight ratio of 10% Al-substituted lithium/manganese spinel | Weight ratio of lithium/nickel/cobalt/manganese composite oxide | Life characteristics (Capacity at 300 cycles relative to initial capacity, %) |
|---|---|---|---|
| Ex. 7 | 90 | 10 | 81 |
| Ex. 8 | 70 | 30 | 82 |
| Ex. 9 | 50 | 50 | 84 |
| Ex. 10 | 30 | 70 | 82 |
| Ex. 11 | 10 | 90 | 81 |
| Comp. Ex. 4 | 100 | 0 | 64 |
| Comp. Ex. 5 | 0 | 100 | 80 |

As can be seen from Table 2, life characteristics of the battery began to improve when more than 10% lithium/nickel/cobalt/manganese composite oxide was added to the Al-substituted lithium/manganese spinel oxide, and it could be confirmed that the thus-obtained life characteristics are similar to life characteristics achieved upon addition of more than 30% lithium/nickel/cobalt/manganese composite oxide. However, an excessively high content of the lithium/nickel/cobalt/manganese composite oxide may result in relatively low safety of the battery and therefore it is preferred to use the lithium/nickel/cobalt/manganese composite oxide in an amount of less than 90%.

Example 12

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.4}Mn_{0.4}Co_{0.2}O_2$ in a weight ratio of 90:10. The thus-fabricated lithium secondary battery was subjected to charge/discharge cycling in a voltage range of 3.0 to 4.2V and life characteristics of the battery were measured. The results are given in Table 3 below.

Example 13

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.4}Mn_{0.4}Co_{0.2}O_2$ in a weight ratio of 70:30. The thus-fabricated lithium secondary battery was subjected to charge/discharge cycling in a voltage range of 3.0 to 4.2V and life characteristics of the battery were measured. The results are given in Table 3 below.

Example 14

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.4}Mn_{0.4}Co_{0.2}O_2$ in a weight ratio of 50:50 (1:1). The thus-fabricated lithium secondary battery was subjected to charge/discharge cycling in a voltage range of 3.0 to 4.2V and life characteristics of the battery were measured. The results are given in Table 3 below.

Example 15

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.4}Mn_{0.4}Co_{0.2}O_2$ in a weight ratio of 30:70. The thus-fabricated lithium secondary battery was subjected to charge/discharge cycling in a voltage range of 3.0 to 4.2V and life characteristics of the battery were measured. The results are given in Table 3 below.

Example 16

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+x}Ni_{0.4}Mn_{0.4}Co_{0.2}O_2$ in a weight ratio of 10:90. The thus-fabricated lithium secondary battery was subjected to charge/discharge cycling in a voltage range of 3.0 to 4.2V and life characteristics of the battery were measured. The results are given in Table 3 below.

Comparative Example 6

A lithium secondary battery was assembled in the same manner as in Example 1, except that a cathode active material was prepared using only a lithium/nickel/cobalt/manganese composite oxide of $Li_{1+z}Ni_{0.4}Mn_{0.4}Co_{0.2}O_2$. The thus-fabricated lithium secondary battery was subjected to charge/discharge cycling in a voltage range of 3.0 to 4.2V and life characteristics of the battery were measured. The results are given in Table 3 below.

TABLE 3

| | Weight ratio of 10% Al-substituted lithium/manganese spinel | Weight ratio of lithium/nickel/cobalt/manganese composite oxide | Life characteristics (Capacity at 300 cycles relative to initial capacity, %) |
|---|---|---|---|
| Ex. 12 | 90 | 10 | 81 |
| Ex. 13 | 70 | 30 | 81 |
| Ex. 14 | 50 | 50 | 84 |
| Ex. 15 | 30 | 70 | 82 |
| Ex. 16 | 10 | 90 | 80 |
| Comp. Ex. 4 | 100 | 0 | 64 |
| Comp. Ex. 6 | 0 | 100 | 78 |

As can be seen from Table 3, life characteristics of the battery began to improve when more than 10% lithium/nickel/cobalt/manganese composite oxide was added to the Al-substituted lithium/manganese spinel, and it could be confirmed that the thus-obtained life characteristics are similar to life characteristics achieved upon addition of more than 30% lithium/nickel/cobalt/manganese composite oxide. However, an excessively high content of the lithium/nickel/cobalt/manganese composite oxide may result in relatively low safety of the battery and therefore it is preferred to use the lithium/nickel/cobalt/manganese composite oxide in an amount of less than 90%.

Example 17

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.53}Mn_{0.26}Co_{0.21}O_2$ in a weight ratio of 70:30. The thus-fabricated lithium secondary battery was subjected to charge/discharge cycling in a voltage range of 3.0 to 4.2V and life characteristics of the battery were measured. The results are given in Table 4 below.

Example 18

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.53}Mn_{0.26}Co_{0.21}O_2$ in a weight ratio of 50:50. The thus-fabricated lithium secondary battery was subjected to charge/discharge cycling in a voltage range of 3.0 to 4.2V and life characteristics of the battery were measured. The results are given in Table 4 below.

Example 19

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.53}Mn_{0.26}Co_{0.21}O_2$ in a weight ratio of 30:70. The thus-fabricated lithium secondary battery was subjected to charge/discharge cycling in a voltage range of 3.0 to 4.2V and life characteristics of the battery were measured. The results are given in Table 4 below.

Example 20

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.47}Mn_{0.30}Co_{0.23}O_2$ in a weight ratio of 50:50. The thus-fabricated lithium secondary battery was subjected to charge/discharge cycling in a voltage range of 3.0 to 4.2V and life characteristics of the battery were measured. The results are given in Table 4 below.

Example 21

A lithium secondary battery was assembled in the same manner as in Example 1, except that a cathode active material was prepared using a substituted lithium/manganese spinel oxide of $Li_{1+x}Mn_{1.9}Al_{0.1}O_4$ and a lithium/nickel/cobalt/manganese composite oxide of $Li_{1+z}Ni_{0.61}Mn_{0.21}Co_{0.18}O_2$ in a weight ratio of 50:50. The thus-fabricated lithium secondary battery was subjected to charge/discharge cycling in a voltage range of 3.0 to 4.2V and life characteristics of the battery were measured. The results are given in Table 4 below.

Example 22

A lithium secondary battery was assembled in the same manner as in Example 1, except that a cathode active material was prepared using a substituted lithium/manganese spinel oxide of $Li_{1+x}Mn_{1.9}Mg_{0.1}O_4$ and a lithium/nickel/cobalt/manganese composite oxide of $Li_{1+z}Ni_{0.53}Mn_{0.26}Co_{0.21}O_2$ in a weight ratio of 50:50. The thus-fabricated lithium secondary battery was subjected to charge/discharge cycling in a voltage range of 3.0 to 4.2V and life characteristics of the battery were measured. The results are given in Table 4 below.

표4]

| | Substituted lithium/manganese spinel (weight ratio) | lithium/nickel/cobalt/manganese composite oxide (weight ratio) | Life characteristics (Capacity at 300 cycles relative to initial capacity, %) |
|---|---|---|---|
| Ex. 17 | $Li_{1+x}Mn_{1.9}Al_{0.1}O_4$ (70) | $Li_{1+z}Ni_{0.53}Mn_{0.26}Co_{0.21}O_2$ (30) | 86 |
| Ex. 18 | $Li_{1+x}Mn_{1.9}Al_{0.1}O_4$ (50) | $Li_{1+z}Ni_{0.53}Mn_{0.26}Co_{0.21}O_2$ (50) | 88 |
| Ex. 19 | $Li_{1+x}Mn_{1.9}Al_{0.1}O_4$ (30) | $Li_{1+z}Ni_{0.53}Mn_{0.26}Co_{0.21}O_2$ (30) | 87 |
| Ex. 20 | $Li_{1+x}Mn_{1.9}Al_{0.1}O_4$ (50) | $Li_{1+z}Ni_{0.47}Mn_{0.30}Co_{0.23}O_2$ (50) | 85 |
| Ex. 21 | $Li_{1+x}Mn_{1.9}Al_{0.1}O_4$ (50) | $Li_{1+z}Ni_{0.61}Mn_{0.21}Co_{0.18}O_2$ (50) | 86 |
| Ex. 22 | $Li_{1+x}Mn_{1.9}Mg_{0.1}O_4$ (50) | $Li_{1+z}Ni_{0.53}Mn_{0.26}Co_{0.21}O_2$ (50) | 86 |

As can be seen from Table 4, life characteristics of the battery further improved when the lithium/nickel/cobalt/manganese composite oxide according to Formula IIa was added to the substituted lithium/manganese spinel compared to the case of adding $Li_{1+z}Ni_{1/3}Co_{1/3}Mn_{1/3}O_2$ (Examples 8-10) or $Li_{1+z}Ni_{0.4}Mn_{0.4}Co_{0.2}O_2$ (Examples 13-15). This is because the structural stability of the lithium/nickel/cobalt/manganese composite oxide according to Formula IIa contributes to the life characteristics.

INDUSTRIAL APPLICABILITY

As apparent from the above description, a lithium secondary battery using a mixture of a manganese spinel oxide having a substitution of a manganese (Mn) site with a certain metal element and a certain lithium/nickel/cobalt/manganese composite oxide, according to the present invention, as a cathode active material, can secure safety of the battery and improve a service life thereof, even under high current, short period charge/discharge cycle conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material for a lithium secondary battery, comprising a mixture of a lithium/manganese spinel oxide of Formula I and a lithium/nickel/cobalt/manganese oxide of Formula II:

$$Li_{1+x}Mn_{2-y}M_yO_4 \quad (I)$$

$$Li_{1+z}Ni_bMn_cCo_{1-(b+c)}O_2 \quad (II)$$

wherein,
M is a metal having an oxidation number of 2 to 3;
$0 \leq x \leq 0.2$;
$0 < y \leq 0.2$;
$-0.1 \leq z \leq 0.1$;

$0.4 \leq b \leq 0.7$;

$0.1 \leq c \leq 0.5$; and $0.6 \leq b+c \leq 0.9$, wherein, in the lithium/nickel/cobalt/manganese composite oxide, lithium ions intercalate into and deintercalate from mixed transition metal oxide layers ("MO layers") and some of MO layer-derived Ni ions are inserted into intercalation/deintercalation layers of lithium ions ("lithium layers") to thereby interconnect the MO layers, wherein the lithium/nickel/cobalt/manganese composite oxide may have preferably a structure wherein $Ni^{2+}$ and $Ni^{3+}$ coexist in the MO layers and some of $Ni^{2+}$ are inserted into the lithium layers, wherein the mole fraction of $Ni^{2+}$ inserted and bound into the lithium layers is in a range of 0.03 to 0.07, based on the total content of Li sites present in the lithium layers, wherein the mixing ratio of the lithium/manganese spinel oxide of Formula I: the lithium/nickel/cobalt/manganese composite oxide of Formula II is in the range of 10:90 to 90:10 (w/w); and wherein the cathode active material exhibits the life characteristics that the capacity at 300 cycles is more than 80% relative to the initial capacity.

2. The cathode active material according to claim 1, wherein M in Formula I is aluminum (Al), magnesium (Mg) or both of them.

3. The cathode active material according to claim 1, wherein the value of y is in the range of 0.01 to 0.2.

4. The cathode active material according to claim 1, wherein the element composition meets the requirements of $0.45 \leq b \leq 0.65$, $0.2 \leq c \leq 0.4$, and $0.65 \leq b+c \leq 0.85$.

5. A lithium secondary battery comprising cathode active material of claim 1.

* * * * *